(12) United States Patent
Velev et al.

(10) Patent No.: US 11,765,568 B2
(45) Date of Patent: Sep. 19, 2023

(54) DETERMINING REMOTE UNIT BEHAVIOR PARAMETERS

(71) Applicant: Lenovo (Singapore) PTE. LTD., New Tech Park (SG)

(72) Inventors: Genadi Velev, Darmstadt (DE); Dimitrios Karampatsis, Ruislip (GB); Apostolis Salkintzis, Athens (GR); Andreas Kunz, Ladenburg (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/718,078

(22) Filed: Apr. 11, 2022

(65) Prior Publication Data
US 2022/0240075 A1 Jul. 28, 2022

Related U.S. Application Data

(63) Continuation of application No. 17/045,621, filed as application No. PCT/EP2018/058917 on Apr. 6, 2018, now Pat. No. 11,304,049.

(51) Int. Cl.
*H04W 8/00* (2009.01)
*H04W 4/50* (2018.01)
*H04W 4/20* (2018.01)
*H04W 8/26* (2009.01)
*H04W 48/08* (2009.01)
*H04W 88/08* (2009.01)

(52) U.S. Cl.
CPC ............. *H04W 8/005* (2013.01); *H04W 4/20* (2013.01); *H04W 4/50* (2018.02); *H04W 8/26* (2013.01); *H04W 48/08* (2013.01); *H04W 88/08* (2013.01)

(58) Field of Classification Search
None
See application file for complete search history.

(56) References Cited

U.S. PATENT DOCUMENTS

2018/0227873 A1* 8/2018 Vrzic ................... H04W 28/26

FOREIGN PATENT DOCUMENTS

WO  2017/173404 A1  10/2017

OTHER PUBLICATIONS

Ericsson et al., "23.502: PDU Session Establishment procedure", SA WG2 Meeting #118BIS S2-170140, Jan. 16-20, 2017, pp. 1-7.

(Continued)

*Primary Examiner* — Suhail Khan
(74) *Attorney, Agent, or Firm* — Kunzler Bean & Adamson

(57) ABSTRACT

Apparatuses, methods, and systems are disclosed for determining remote unit behavior parameters. One method includes receiving a message including parameters associated with an application in a remote unit. The method includes determining a first set of parameters including a first portion of the parameters, wherein each parameter of the first set of parameters corresponds to a remote unit behavior. The method includes determining a second set of parameters including a second portion of the parameters, wherein each parameter of the second set of parameters corresponds to a service behavior. The method includes associating the second set of parameters with a data network name, a single network slice selection assistance information, or a combination thereof.

20 Claims, 9 Drawing Sheets

(56) References Cited

OTHER PUBLICATIONS

China Mobile et al., "23.502: Service definition and applies to PDU Session Establishment", SA WG2 Meeting #118-BIS S2-170593, Jan. 16-20, 2017, pp. 1-10.
3GPP, "3rd Generation Partnership Project; Technical Specification Group Services and System Aspects; Architecture enhancements to facilitate communications with packet data networks and applications (Release 15)", 3GPP TS 23.682 V15.4.0, Mar. 2018, pp. 1-124.
3GPP, "3rd Generation Partnership Project; Technical Specification Group Services and System Aspects; Procedures for the 5G System; Stage 2 (Release 15)", 3GPP TS 23.502 V1.3.0, Nov. 2017, pp. 1-215.
3GPP, "3rd Generation Partnership Project; Technical Specification Group Services and System Aspects; System Architecture for the 5G System; Stage 2 (Release 15)", 3GPP TS 23.501 V15.1.0, Mar. 2018, pp. 1-201.
3GPP, "3rd Generation Partnership Project; Technical Specification Group Services and System Aspects; Telecommunication management; Charging management; Charging architecture and principles (Release 15)", 3GPP TS 32.240 V15.1.0, Mar. 2018, pp. 1-58.
3GPP, "3rd Generation Partnership Project; Technical Specification Group Services and System Aspects; NR; User Equipment (UE) procedures in Idle mode and RRC Inactive state (Release 15)", 3GPP TS 38.304 v1.0.0, Mar. 2018, pp. 1-21.

\* cited by examiner

DETERMINING REMOTE UNIT BEHAVIOR PARAMETERS

CROSS-REFERENCE TO RELATED APPLICATIONS

This application is a continuation application of U.S. patent application Ser. No. 17/045,621, filed on Oct. 6, 2020, which is incorporated herein by reference in its entirety.

FIELD

The subject matter disclosed herein relates generally to wireless communications and more particularly relates to determining remote unit behavior parameters.

BACKGROUND

The following abbreviations are herewith defined, at least some of which are referred to within the following description: Third Generation Partnership Project ("3GPP"), Positive-Acknowledgment ("ACK"), Access and Mobility Management Function ("AMF"), Access Network ("AN"), Application Function ("AF"), Application Programming Interface ("API"), Access Point Name ("APN"), Aggregate MBR ("AMBR"), Application Server ("AS"), Connection Management ("CM"), Core Network ("CN"), Communication Pattern ("CP"), Control Plane/User Plane ("CP/UP"), Discontinuous Reception ("DRX"), Downlink ("DL"), Data Network Access Identifier ("DNAI"), Data Network ("DN"), Data Network Name ("DNN"), Domain Name System ("DNS"), Enhanced Discontinuous Reception ("eDRX"), Enhanced Mobile Broadband ("eMBB"), Evolved Node B ("eNB"), Generic Public Subscription Identifier ("GPSI"), Home Public Land Mobile Network ("HPLMN"), Home Subscriber Server ("HSS"), Identity or Identifier or Identification ("ID"), International Mobile Subscriber Identity ("IMSI"), Internet-of-Things ("IoT"), Internet Protocol ("IP"), Long Term Evolution ("LTE"), Multiple Access ("MA"), Maximum Bit Rate ("MBR"), Modulation Coding Scheme ("MCS"), Mobile Country Code ("MCC"), Mobility Management ("MM"), Mobility Management Entity ("MME"), Mobile Network Code ("MNC"), Mobile Network Operator ("MNO"), Machine Type Communication ("MTC"), Master Information Block ("MIB"), Mobile Initiated Connection Only ("MICO"), Mobility Management ("MM"), Mobile Station International Subscriber Directory Number ("MSISDN"), Non-Access Stratum ("NAS"), Narrowband ("NB"), North Bound Interface ("NBI"), Network Parameter Configuration ("NC"), Negative-Acknowledgment ("NACK") or ("NAK"), Network Exposure Function ("NEF"), Next Generation ("NG"), Next Generation Node B ("gNB"), Policy Control Function ("PCF"), Protocol Data Unit ("PDU"), Public Land Mobile Network ("PLMN"), Power Saving Mode ("PSM"), Pointer ("PTR"), Quality of Service ("QoS"), QoS Flow Identifiers ("QFIs"), Radio Resource Control ("RRC"), Radio Access Network ("RAN"), Radio Access Technology ("RAT"), Receive ("RX"), Single Carrier Frequency Division Multiple Access ("SC-FDMA"), Service Capability Exposure Function ("SCEF"), Service Capability Servers ("SCS"), Service Level Agreement ("SLA"), Subscriber Management ("SM"), Subscriber Management Function ("SMF"), Single Network Slice Selection Assistance Information ("S-NSSAI"), Subscriber Identity Module ("SIM"), System Information Block ("SIB"), Short Message Service ("SMS"), Signaling Radio Bearers ("SRBs"), Session and Service Continuity ("SSC"), Subscription Concealed Identifier ("SUCI"), Subscription Permanent Identifier ("SUPI"), Transmit ("TX"), Unified Data Management ("UDM"), User Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane ("UP"), User Plane Function ("UPF"), Visited Public Land Mobile Network ("VPLMN").

In certain wireless communications networks, a remote unit may have various associated behavior parameters. In such networks, network devices associated with the remote unit may receive information corresponding to the behavior parameters.

BRIEF SUMMARY

Methods for determining remote unit behavior parameters are disclosed. Apparatuses and systems also perform the functions of the apparatus. In one embodiment, the method includes receiving a message including parameters associated with an application in a remote unit. In various embodiments, the method includes determining a first set of parameters including a first portion of the parameters, wherein each parameter of the first set of parameters corresponds to a remote unit behavior. In certain embodiments, the method includes determining a second set of parameters including a second portion of the parameters, wherein each parameter of the second set of parameters corresponds to a service behavior. In some embodiments, the method includes associating the second set of parameters with a data network name, a single network slice selection assistance information, or a combination thereof.

In one embodiment, receiving the message includes receiving one or more messages, and each of the one or more messages contains a validity time for parameters included therein. In a further embodiment, receiving the message includes receive the message from a network exposure function. In certain embodiments, the method includes transmitting the first set of parameters to an access and mobility management function. In various embodiments, the access and mobility management function determines how to configure the remote unit, a base station, or a combination thereof, based on the first set of parameters.

In some embodiments, the method includes transmitting the second set of parameters to a session management function. In various embodiments, the session management function configures one or more network functions or radio entities using the second set of parameters, and the one or more network functions are configured with information specific to a protocol data unit session, a traffic flow, or a combination thereof. In one embodiment, the parameters include information indicating a preference for either a control plane transmission or a user plane transmission. In various embodiments, the parameters include information indicating an internet protocol address, a port number, or a combination thereof corresponding to a service server, an application server, or a combination thereof. In certain embodiments, the parameters include information indicating an identifier corresponding to a service server, an application server, an application, or some combination thereof.

An apparatus for determining remote unit behavior parameters, in one embodiment, includes a receiver that receives a message including parameters associated with an application in a remote unit. In various embodiments, the apparatus includes a processor that: determines a first set of parameters including a first portion of the parameters, wherein each parameter of the first set of parameters corresponds to a remote unit behavior; determines a second set of parameters including a second portion of the parameters, wherein each parameter of the second set of parameters corresponds to a service behavior; and associates the second set of parameters with a data network name, a single network slice selection assistance information, or a combination thereof.

In one embodiment, a method for determining remote unit behavior parameters includes receiving a message including a third set of parameters. In various embodiments, the method includes determining a fourth set of parameters including a first portion of the third set of parameters, wherein each parameter of the fourth set of parameters corresponds to remote unit session behavior. In certain embodiments, the method includes determining a fifth set of parameters including a second portion of the third set of parameters, wherein each parameter of the fifth set of parameters corresponds to a service behavior.

In one embodiment, the method includes transmitting the fourth set of parameters to an access and mobility management function. In a further embodiment, the method includes determining configuration information for a user plane function based on the fifth set of parameters, and transmitting the configuration information to the user plane function. In certain embodiments, the method includes determining configuration information for a base station based on the fifth set of parameters. In some embodiments, the method includes transmitting the configuration information to the base station. In certain embodiments, the third set of parameters includes a first set of parameters corresponding to a remote unit behavior. In various embodiments, the third set of parameters includes a second set of parameters corresponding to a service behavior. In some embodiments, the third set of parameters includes a first set of parameters corresponding to a remote unit behavior and a second set of parameters corresponding to a service behavior.

An apparatus for determining remote unit behavior parameters, in one embodiment, includes a receiver that receives a message including a third set of parameters. In various embodiments, the apparatus includes a processor that: determines a fourth set of parameters including a first portion of the third set of parameters, wherein each parameter of the fourth set of parameters corresponds to remote unit session behavior; and determines a fifth set of parameters including a second portion of the third set of parameters, wherein each parameter of the fifth set of parameters corresponds to a service behavior.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
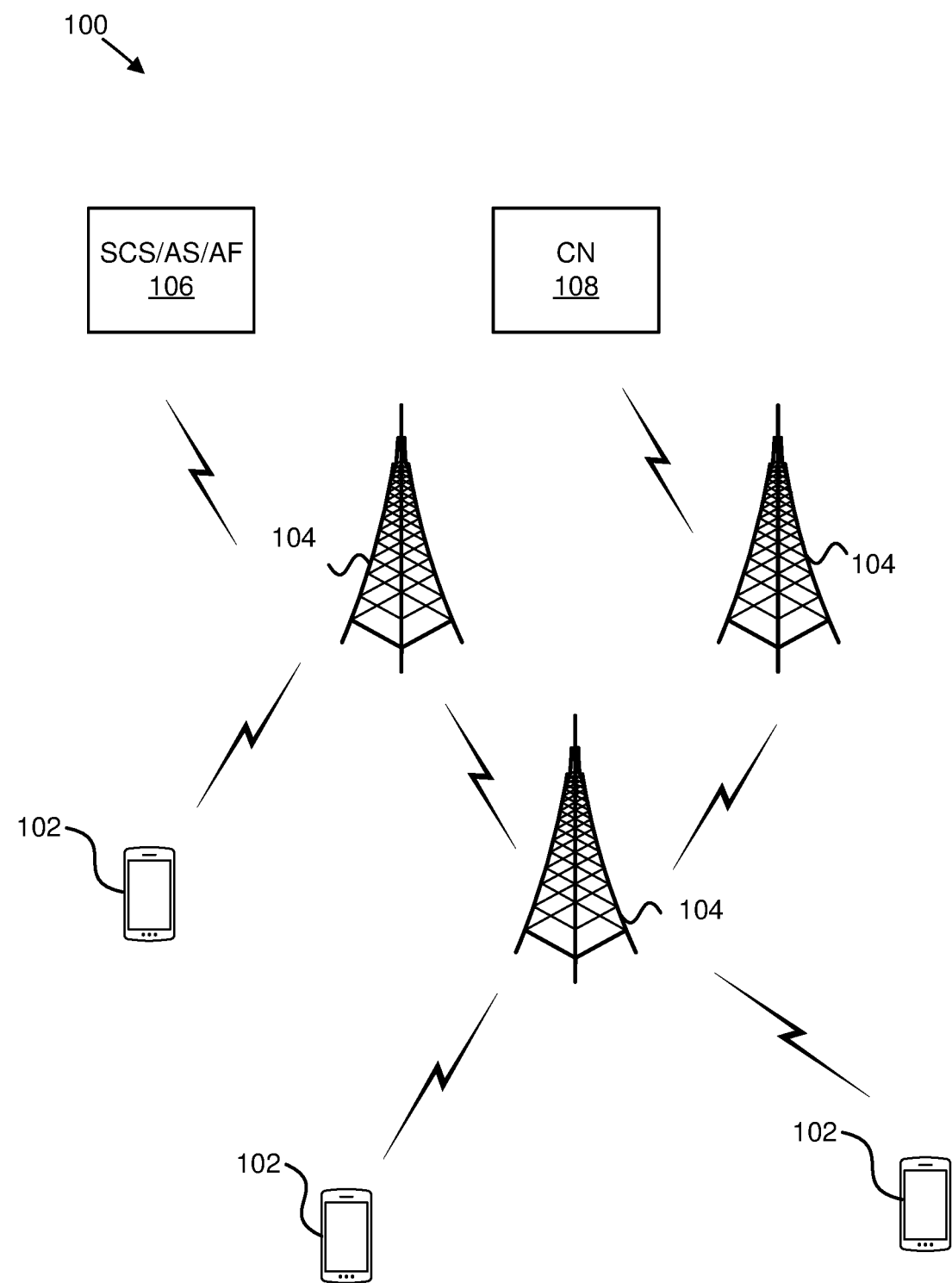
FIG. 1 is a schematic block diagram illustrating one embodiment of a wireless communication system for determining remote unit behavior parameters.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining remote unit behavior parameters. In one embodiment, the wireless communication system 100 includes remote units 102, network units 104, one or more SCS/AS/AFs 106, and one or more CNs 108. Even though a specific number of remote units 102, network units 104, SCS/AS/AFs 106, and CNs 108 are depicted in FIG. 1, one of skill in the art will recognize that any number of remote units 102, network units 104, SCS/AS/AFs 106, and CNs 108 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a network device, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. Further, the CN 108 may communicate with the SCS/AS/AF 106 which may be under control of the same network operator (as the radio access and core networks) or another service provider or operator. In some embodiments, a network unit 104 may include one or more of the following network components a gNB, a NG-RAN node, and/or a RAN node. The CN 108 may include an MME, an HSS, an SCEF, an AMF, an SMF, an NEF, a DB, a PCF, a UDR, a UPF, and/or a UDM.

In one implementation, the wireless communication system 100 is compliant with the LTE of the 3GPP protocol, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may receive a message including parameters associated with an application in a remote unit 102. In various embodiments, the network unit 104 may determine a first set of parameters including a first portion of the parameters, wherein each parameter of the first set of parameters corresponds to a remote unit behavior. In certain embodiments, the network unit 104 may determine a second set of parameters including a second portion of the parameters, wherein each parameter of the second set of parameters corresponds to a service behavior. In some embodiments, the network unit 104 may associate the second set of parameters with a data network name, a single network slice selection assistance information, or a combination thereof. Accordingly, a network unit 104 may be used for determining remote unit 102 behavior parameters.

In certain embodiments, a network unit 104 may receive a message including a third set of parameters. In various embodiments, the network unit 104 may determine a fourth set of parameters including a first portion of the third set of parameters, wherein each parameter of the fourth set of parameters corresponds to remote unit session behavior. In certain embodiments, the network unit 104 may determine a fifth set of parameters including a second portion of the third set of parameters, wherein each parameter of the fifth set of parameters corresponds to a service behavior. Accordingly, a network unit 104 may be used for determining remote unit 102 behavior parameters.

Figure 2:
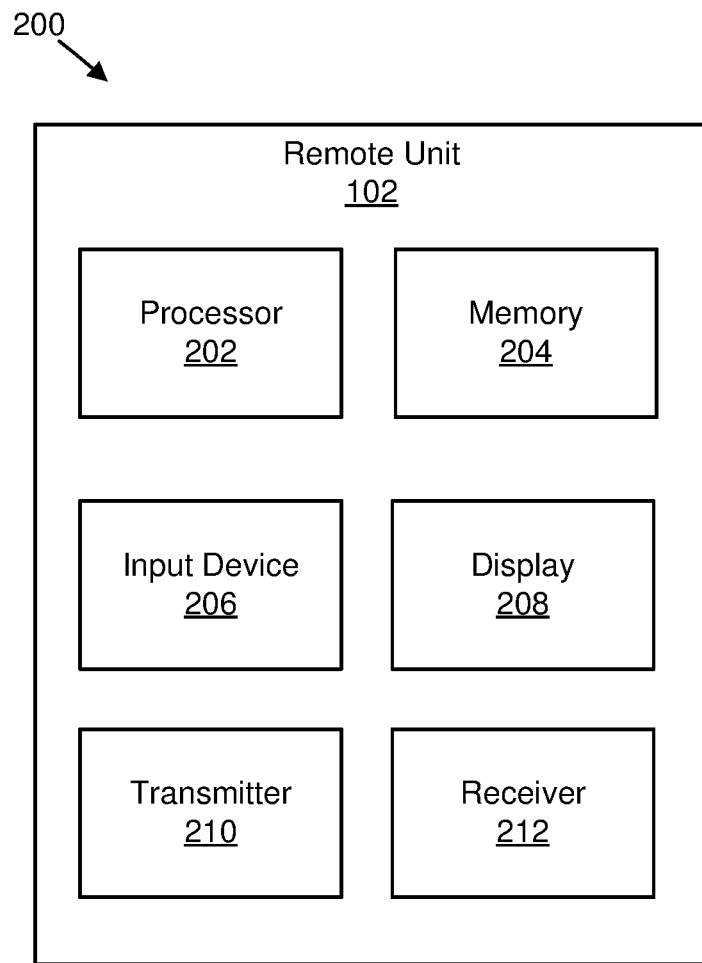
FIG. 2 is a schematic block diagram illustrating one embodiment of an apparatus that may be used for transmitting and/or receiving messages.

FIG. 2 depicts one embodiment of an apparatus 200 that may be used for transmitting and/or receiving messages. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to network registration. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
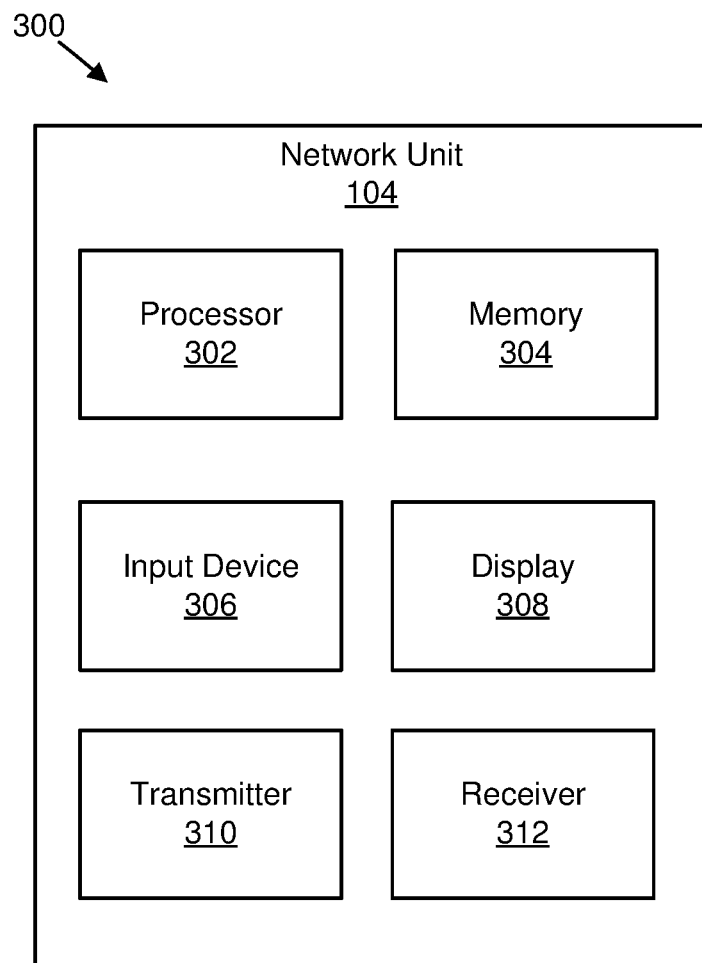
FIG. 3 is a schematic block diagram illustrating one embodiment of an apparatus that may be used for determining remote unit behavior parameters.

FIG. 3 depicts one embodiment of an apparatus 300 that may be used for determining remote unit 102 behavior parameters. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 receives a message including parameters associated with an application in a remote unit 102. In various embodiments, the processor 302: determines a first set of parameters including a first portion of the parameters, wherein each parameter of the first set of parameters corresponds to a remote unit behavior; determines a second set of parameters including a second portion of the parameters, wherein each parameter of the second set of parameters corresponds to a service behavior; and associates the second set of parameters with a data network name, a single network slice selection assistance information, or a combination thereof.

In one embodiment, the receiver 312 receives a message including a third set of parameters. In various embodiments, the processor 302: determines a fourth set of parameters including a first portion of the third set of parameters, wherein each parameter of the fourth set of parameters corresponds to remote unit session behavior; and determines a fifth set of parameters including a second portion of the third set of parameters, wherein each parameter of the fifth set of parameters corresponds to a service behavior. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
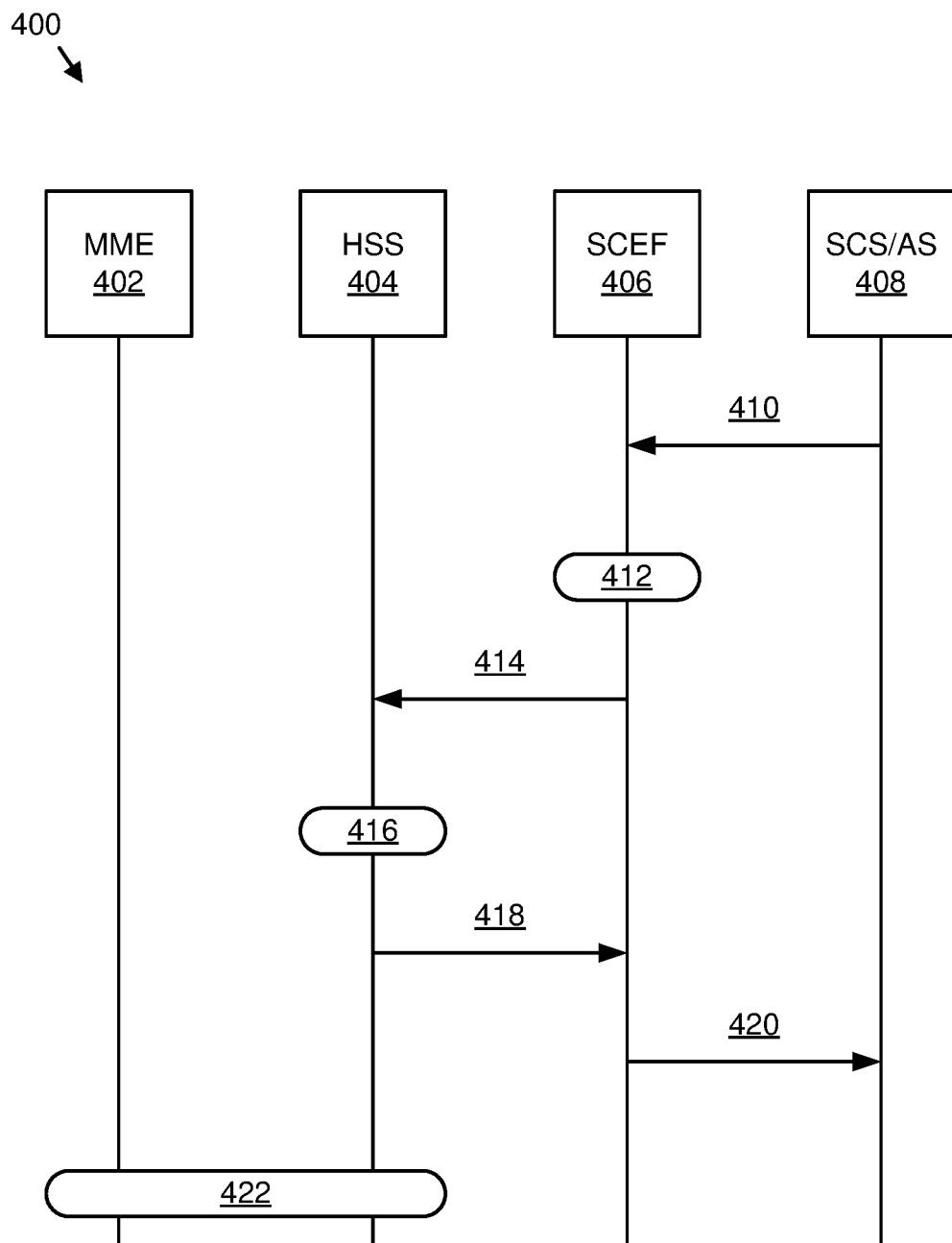
FIG. 4 illustrates one embodiment of communications of remote unit behavior parameters.

FIG. 4 illustrates one embodiment of communications 400 of remote unit 102 behavior parameters. Specifically, communications 400 between an MIME 402, an HSS 404, an SCEF 406, and an SCS/AS 408 are illustrated. As may be appreciated, any of the communications 400 described herein may be considered messages and/or parts of messages. In certain embodiments, the communications 400 may be similar to TS 23.682.

In some embodiments, a first communication 410 from the SCS/AS 408 to the SCEF 406 may include the SCS/AS 408 sending an update request to the SCEF 406. In certain embodiments, the update request may include CP parameters, such as the CP parameters described in Table 1.

TABLE 1

| CP Parameter | Description |
| --- | --- |
| Periodic communication indicator | Identifies whether a UE communicates periodically. |
| Communication duration time | Duration interval time of periodic communication. Example: 5 minutes |
| Periodic time | Interval time of periodic communication. Example: every hour |
| Scheduled communication time | Time zone and day of the week during which a UE is available for communication. Example: Time: 13:00-20:00; Day: Monday. |
| Stationary indication | Identifies whether a UE is stationary or mobile. |

In various embodiments, the SCEF 406 may select 412 a CP parameter. In some embodiments, a second communication 414 from the SCEF 406 to the HSS 404 may include the SCEF 406 sending an update CP parameter request. In certain embodiments, the HSS 404 may update 416 a UE subscription.

In a third communication 418 from the HSS 404 to the SCEF 406, the HSS 404 may send an update CP parameter response. In various embodiments, a fourth communication 420 from the SCEF 406 to the SCS/AS 408 may send an update response. In certain embodiments, the HSS 404 may provide 422 CP parameters and/or a deletion notice to the MME 402. While CP parameters are described in relation to FIG. 4, some embodiments may include one or more CP parameters (e.g., as found in Table 1), one or more expected UE behavior parameters (e.g., as found in Table 2), and/or one or more NC parameters (e.g., as found in Table 3). As may be appreciated, Table 2 parameters may be specified for a 5G system and may also be used in a 4G system (e.g., evolved packed system). Moreover, additional parameters are described herein as described in various embodiments and may be applicable to any of Table 1, Table 2, and/or Table 3, or used independent of the mentioned tables. One such parameter set not mentioned in Tables 1-3 may be parameters for policy information, e.g., infrastructural policy (policies to protect platforms and network, e.g., for ensuring that a service node such as SMS-SC is not overloaded), business policy (policies related to the specific functionalities exposed, e.g., number portability, service routing, subscriber consent, etc.), or application layer policy (policies that are primarily focused on message payload or throughput provided by an application, e.g. how to throttle traffic from this application). Other such parameters not mentioned in Tables 1-3 may be an SCS/AS/AF ID, an SCS/AS source IP address/port number, an SSC mode preference, a CP/UP transmission preference, a DNAI, an expected number of uplink/downlink packets, and/or other parameters as described in certain embodiments herein. All parameters mentioned in this paragraph, but not limited to, may be referred to as CP/NC parameters.

TABLE 2

| Expected UE behavior parameter | Description |
| --- | --- |
| Expected UE moving trajectory | Identifies the UE's expected geographical movement. Example: A planned path of movement. |

TABLE 3

| NC parameter | Description |
| --- | --- |
| Maximum latency | To influence certain aspects of UE/network behavior such as a UE's PSM, extended idle mode DRX. It is a guide for the maximum amount of time between UE reachability events. |
| Maximum response time | To influence certain aspects of UE/network behavior such as the UE's PSM, extended idle mode DRX. It is a guide for how much time the SCS/AS needs to begin sending data to the UE after receiving a reachability notification |
| Suggested number of downlink packets | Can be used for extended buffering configuration. It can be used to configure how many packets should be buffered by the network when the UE is not reachable. |

As used herein, UE behavior related parameters (e.g., CP/NC parameters) may refer to communication pattern parameters, network parameter configuration parameters, and/or other parameters. In some embodiments, CP/NC parameters may be sent from AFs, SCSs, and/or ASs over different APIs exposed by a NEF and/or SCEF. In certain embodiments, an MME and/or AMF may use these CP/NC parameters for RAN configuration tuning and/or MM parameter(s) for UE configuration tuning (e.g., PSM mode timer, eDRX timer, etc.).

In various embodiments, CP/NC parameters associated with an application in a UE may include: a CP parameter set (e.g., a time at which traffic is expected to be sent and/or received) which may include—a stationary parameter, a periodic time, a communication duration, a communication schedule, an SCS/AS ID, an SCS/AS IP address, and so forth; an NC parameter set which may include—a maximum response time, a maximum latency, a suggested number of DL packets, a CP/UP delivery preference, and so forth; and/or a UE moving trajectory.

As may be appreciated, certain CP/NC parameters may be best used and/or processed in an AMF and other CP/NC parameters may be best used and/or processed in an SMF. For example, a UE moving trajectory or stationary parameter may be best processed in the AMF. As another example, other parameters like a suggested number of DL packets may be best processed in the SMF (e.g., to properly configure a UPF).

In certain embodiments, at least some of the CP/NC parameter set may describe an application and/or service behavior rather than UE behavior, especially if a UE uses multiple applications (e.g., multiple SCS/ASs). In such embodiments, at least some of the CP/NC parameters may be associated with one or more corresponding PDU sessions, but not with a general UE behavior. Moreover, in response to a PDU session serving an SCS/AS not currently being established, then CP/NC parameters may not influence a network configuration for a corresponding UE.

In some embodiments, a UDM/UDR may categorizes CP/NC parameters into at least CP/NC MM parameters, CP/NC SM parameters, and/or CP/NC policy parameters. In such embodiments, at least the SM parameters may be associated with a particular subscribed DNN and/or S-NS-SAI. Moreover, the UDM/UDR may determine whether there is a single application or multiple applications on a UE (which may be equal to a single SCS/AS or multiple SCS/ASs). The CP/NC policy parameters are used by the PCF to derive policy rules for the relevant UE's application(s) and PDU Session(s). If there are multiple SCS/ASs associated with the same DNN, a traffic filter (e.g., based on an SCS/AS's IP address) may be used to differentiate traffic from/to multiple SCS/ASs within a same DNN/S-NSSAI. In certain embodiments, the UDM/UDR may use a SCS/AS ID to determine a corresponding DNN and S-NSSAI. In various embodiments, in response to CP/NC parameters being configured and/or updated in a UDM, the UDM may update only an AMF or an SMF associated with the updated MM parameters and/or SM parameters. In some embodiments, in response to CP/NC parameters being configured and/or updated in an NEF, the NEF may update only an AMF or an SMF associated with the updated MM parameters and/or SM parameters.

In certain embodiments, an SMF may receive either an entire CP/NC parameter set sent from NEF/SCEF or CP/NC SM parameters. The SMF may derive PDU session specific characteristics and/or behaviors based on the received parameters. For example, the SMF may derive: configuration parameters for UPF configuration (e.g., a number of buffered downlink packets, how long time packets should be buffered (e.g., determined based on a maximum latency parameter, etc.)); SMF to NG-RAN (e.g., the SMF sends this information during UP connection activation) CP/NC N2 SM information which may include new parameters to influence NG-RAN settings for a radio interface, e.g. known as Uu interface in the 3GPP specifications, (e.g., the NG-RAN node can use these parameters to determine whether to activate RRC inactive state and the corresponding state configuration; and/or for RRC Connected state configuration (e.g. to derive the Inactive time value)); SMF to AMF (e.g., during PDU session establishment or UP connection activation) session parameters (e.g., PDU session specific parameters for UE behavior such as maximum response time being used to configure eDRX or a periodic registration timer when MICO mode is used. RRC inactive state assistance information derived by an AMF may be extended to include new parameters sent from the SMF, but parameters such as periodic time may be signaled from SMF to AMF to be used); SMF-triggered UP connection deactivation or PDU session release; and/or a switch between a control plane to UP delivery mechanism of data (e.g., small data). Please note that according to certain embodiments, the AMF sends RRC inactive assistance information to the NG-RAN node and the additional information described herein may be sent from the SMF in CP/NC N2 SM information to the NG-RAN node to determine the RRC inactive state configuration or RRC connected state configuration.

In some embodiments, a UDM/UDR may not process and/or classify received CP/NC parameters, but may store the CP/NC parameters as session management parameters relevant to a particular DNN and/or S-NSSAI. In such embodiments, the SMF may receive all CP/NC parameters and may processes and/or classify the parameters into MM parameters to be send to an AMF and SM parameters to be further locally processed at the SMF.

Figure 5:
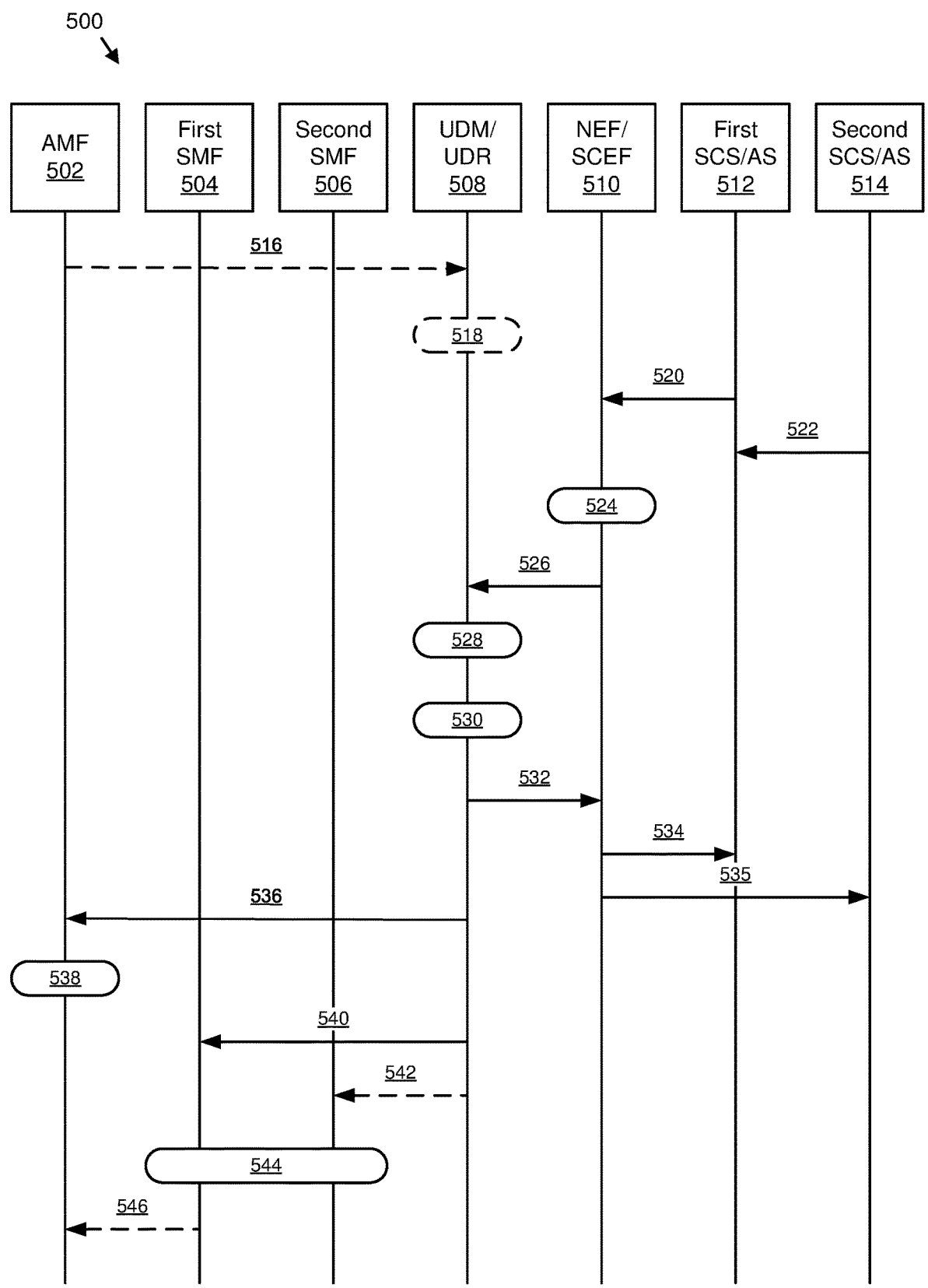
FIG. 5 illustrates another embodiment of communications of remote unit behavior parameters.

In certain embodiments, there may be a SLA between an SCS/AS/AF and an MNO (in case that the SCS/AS/AF is owned or operated by a third party). In such embodiments, a UDR/UDM may associate an SCS/AS ID with at least a subscribed DNN (or APN) or network slice information (e.g., S-NSSAI). FIG. 5 illustrates one embodiment of provisioning CP/NC parameters in the UDM/UDR to an AMF and one or more SMFs.

In various embodiments, in response to there being multiple SCS/ASs using the same DNN/APN and/or PDU session, it may be useful to differentiate traffic from different applications. In such embodiments, the SCS/AS may include in a request to an SCEF/NEF traffic filter information (e.g., SCS/AS source IP address/port number). Moreover, the NEF may store the traffic filter information in an SM parameter and send the traffic filter to the SMF. Furthermore, the SMF may create and store the traffic filter information to determine the application and a corresponding UE behavior. In addition, the SCS/AS may also send to the network (e.g., NEF/SCEF which forwards the information to the UDM/UDR) information about a session continuity preference (e.g., SSC mode) or IP address preservation requirements for a connection between a UE and a network. Such session continuity information may be used in the SMF to determine the SSC mode to be applied to a PDU session and to select an appropriate UPF. Therefore, the UDM/UDR may classify and store such received session continuity information as SM information and send it to the SMF serving a corresponding PDU session. Further, in certain embodiments, an SCS/AS may signal and/or modify a DNAI which may be used to identify a user plane access to one or more DNs at which application server/content are deployed. This information may be used by the SMF to select an appropriate UPF to be close or co-located with a specific application server.

FIG. 5 illustrates another embodiment of communications 500 of remote unit 102 behavior parameters. Specifically, communications 500 between an AMF 502, a first SMF 504, a second SMF 506, a UDM/UDR 508, an NEF/SCEF 510, a first SCS/AS 512, and a second SCS/AS 514 are illustrated. As may be appreciated, any of the communications 500 described herein may be considered messages and/or parts of messages.

In some embodiments, a first communication 516 from the AMF 502 to the UDM/UDR 508 may include the AMF 502 performing a registration procedure and/or a provisioning procedure with the UDM/UDR 508. In the first communication 516, the UDM/UDR 508 may learn the that a UE is configured to use only a single service or single application (e.g., the UE transmission/reception behavior is determined by a single service/application), or the UDM/UDR 508 may learnt that the UE is configured to use multiple services or applications. The UDM/UDR 508 may use this knowledge during classifying 528 in which the UDM/UDR 508 determines how to categorize CP/NC parameters. In various embodiments, the UDM/UDR 508 may determine 518 that it is provisioned with a single application or single service.

In certain embodiments, a second communication 520 from the first SCS/AS 512 to the NEF/SCEF 510 may include the first SCS/AS 512 using various APIs to provide parameters specific to a given UE application (or the UE as such if a single application is used in the UE) to the NEF/SCEF 510 to facilitate efficient network configuration. Moreover, in various embodiments, a third communication 522 from the second SCS/AS 514 to the NEF/SCEF 510 may include the second SCS/AS 512 using various APIs to provide parameters specific to a given UE application to the NEF/SCEF 510 to facilitate efficient network configuration. In some embodiments, the first and second SCS/AS 512 and 514 may add, modify, and/or delete parameters provided to the network (e.g., provided to the NEF/SCEF 510). As may be appreciated, the first and second SCS/AS 512 and 514 may use any existing APIs or other APIs. For example, the APIs may include: an API for CP parameter provisioning (e.g., any CP parameters, SCS/AS IP address, SCS/AS ID); an API for NC parameters; an API for an expected UE moving trajectory parameter. As described herein, any of the CP parameters, NC parameters, expected UE moving trajectory parameters, and/or other parameters may be considered CP/NC parameters.

In various embodiments, the NEF/SCEF 510 may discover 524 the UDM/UDR 508 based on a UE's GPSI which may in turn include an external ID or MSISDN.

In some embodiments, a fourth communication 526 from the NEF/SCEF 510 to the UDM/UDR 508 may include the NEF/SCEF 510 sending an update CP/NC parameter request message to the UDM/UDR 508 for delivering selected CP/NC parameters to one or more UEs. The CP/NC parameters may include a GPSI (which may be an external ID for a single UE or an external ID for a group of UEs), one or more SCEF reference IDs, an SCEF address, one or more CP/NC parameter sets, one or more validity times, one or more SCEF reference IDs for deletion, one or more SCS/AS IDs, and/or other parameters. In various embodiments, the fourth communication 526 may include a Nudm_Parameter-Provision_Update having parameters such as: GPSI, SCS/AS ID, one or more NEF transaction reference IDs, one or more CP/NC parameter sets, one or more validity times, and so forth.

In certain embodiments, the UDM/UDR 508 may categorize 528 CP/NC parameters into at least MM parameters, SM parameters, and/or policy parameters. Moreover, the SM parameters may further be associated with a particular subscribed DNN and/or S-NSSAI. Furthermore, the UDM/ UDR 508 may determine whether there are one or more applications on a UE (which may correspond to single or multiple SCS/ASs). In some embodiments, the UDM/UDR 508 uses a SCS/AS ID to determine corresponding DNN and/or S-NSSAI. In one embodiment, in response to a UE using a single service or application, the UDM/UDR 508 may decide to store all parameters as MM parameters and send them to the AMF 502. In certain embodiments, in response to a UE using multiple services and/or applications, the UDM/UDR 508 may decide to categorize the CP/NC parameters into CP/NC MM parameters and CP/NC SM parameters. In various embodiments, if there are multiple SCS/ASs associated with a same DNN and/or S-NSSAI, a traffic filter (e.g., based on a SCS/AS's IP address) may be used to differentiate traffic from/to multiple SCS/ASs within the same DNN and/or S-NSSAI.

In various embodiments, all CP/NC parameter sets may be stored as SM parameters in a corresponding DNN and/or S-NSSAI subscription data. In such embodiments, the processing and or further classification of the CP/NC parameter sets may be performed at an SMF and the SMF may determine which parameters are forwarded to the AMF 502 as session parameter sets.

In certain embodiments, in response to there being no subscribed DNN for a UE (e.g., the UE uses only SMS or other messaging service without a need of a PDU session) or if a SCS/AS ID associated with CP/NC parameters received from the NEF/SCEF 510 does not correspond to a DNN, then the CP/NC parameter sets may be categorized as CP/NC MM parameters. In such embodiments, the UDM/ UDR 508 stores the CP/NC parameter sets received from the NEF/SCEF 510 as CP/NC MM parameters and the UDM/ UDR 508 sends the CP/NC MM parameters to the AMF 502.

In some embodiments, in response to some parameters from SCS/AS or AF being explicitly indicated as mobility-related or access-related parameters (e.g., a UE trajectory), the UDM/UDR 508 may categorize those parameters as CP/NC MM parameters and send them to the AMF 502.

In various embodiments, the UDM/UDR 508 may update 530 corresponding fields in a UE subscription (e.g., see Table 4). In some embodiments, in response to CP/NC parameter sets being added, modified, and/or deleted in the UDM/UDR 508, the UDM/UDR 508 may update: only the AMF 502 if the CP/NC parameters were MM related; only SMFs associated with the CP/NC SM parameters if the CP/NC parameters were SM related; or both the AMF 502 and one or more SMFs if the CP/NC parameters contained both MM and SM related parameters.

In certain embodiments, a fifth communication 532 from the UDM/UDR 508 to the NEF/SCEF 510 may include the UDM/UDR 508 sending an update CP parameter response to the NEF/SCEF 510. In some embodiments, a sixth communication 534 from the NEF/SCEF 510 to the first SCS/AS 512 may include the NEF/SCEF 510 sending an update response to the first SCS/AS 512. In various embodiments, a seventh communication 535 from the NEF/SCEF 510 to the second SCS/AS 514 may include the NEF/SCEF 510 sending an update response to the second SCS/AS 514.

In certain embodiments, an eighth communication 536 from the UDM/UDR 508 to the AMF 502 may include the UDM/UDR 508 sending an update with MM parameters to the AMF 502. In some embodiments, in the eighth communication 536, the UDM/UDR 508 may initiate an insert subscription data procedure for each UE to send the CP/NC parameter sets with corresponding validity times, SCEF Reference IDs, and SCEF Reference IDs for deletion to the AMF 502.

In various embodiments, the eighth communication 536 may include a Nudm_SubscriberDataManagement parameter, a (SDM)_Notification, a SUPI, MM parameters, and so forth. In certain embodiments, the AMF 502 may use 538 the CP/NC MM parameters to derive expected UE behaviors. In some embodiments, the AMF 502 may send a periodic time parameter (e.g., as part of the CP parameter set) to a RAN as part of enhanced RRC inactive assistance information or the AMF 502 uses the periodic time to derive an expected UE activity behavior as part of the CN assisted RAN parameters tuning information. In such embodiments, the RAN may use this information (e.g. periodic time) to determine whether to configure an RRC inactive state for the UE. For example, in response to a periodic time being 30 seconds, the RAN may determine to configure the RRC inactive state to avoid increased signaling (e.g., perform a service request procedure every 30 seconds) and instead use a resume procedure. In some embodiments, the AMF 502 may use the MM parameters to determine RRC inactive assistance information or to enhance this information with other information (e.g., a periodic time parameter).

As may be appreciated, the AMF 502 may use 538 the CP/NC MM parameters to derive expected UE behaviors after the communication 546. For example, the first SMF 504 may include a periodic time as a session parameter sent to the AMF 502 that the AMF 502 uses to derive expected UE behaviors.

In certain embodiments, a ninth communication 540 from the UDM/UDR 508 to the first SMF 504 may include the UDM/UDR 508, in response to new or updated CP/NC parameters being provided to the UDM/UDR 508, initiating an insert subscription data procedure for each UE to send CP/NC SM parameter sets with corresponding validity times, SCEF reference IDs, and/or SCEF reference IDs for deletion to the first SMF 504. In various embodiments, the ninth communication 540 may include a Nudm_SubscriberDataManagement parameter, a (SDM) Notification, a SUPI, MM parameters, and so forth. In some embodiments, in response to the UDM/UDR 508 categorizing 528 the CP/NC parameter sets into CP/NC MM parameters and CP/NC SM parameters, the CP/NC SM parameters may contain a subset of the CP/NC parameters. In various embodiments, the UDM/UDR 508 stores whole CP/NC parameter sets as CP/NC SM parameters, and the CP/NC SM parameters are sent to the first SMF 504 as whole CP/NC parameter sets.

In some embodiments, a tenth communication 542 from the UDM/UDR 508 to the second SMF 506 may include the UDM/UDR 508, in response to new or updated CP/NC parameters being provided to the UDM/UDR 508, initiating an insert subscription data procedure for each UE to send CP/NC SM parameter sets with corresponding validity times, SCEF reference IDs, and/or SCEF reference IDs for deletion to the second SMF 506. In various embodiments, the tenth communication 542 may include a Nudm_SubscriberDataManagement parameter, a (SDM) Notification, a SUPI, MM parameters, and so forth. In some embodiments, in response to the UDM/UDR 508 categorizing 528 the CP/NC parameter sets into CP/NC MM parameters and CP/NC SM parameters, the CP/NC SM parameters may contain a subset of the CP/NC parameters. In various embodiments, the UDM/UDR 508 stores whole CP/NC parameter sets as CP/NC SM parameters, and the CP/NC SM parameters are sent to the second SMF 506 as whole CP/NC parameter sets.

In various embodiments, the first and/or second SMFs 504 and 506 may process 544 the received CP/NC SM parameters, identify whether there are overlapping CP/NC SM parameter sets, and/or merge CP/NC SM parameter sets. In some embodiments, the first and/or second SMFs 504 and 506 may derive session parameters (e.g., MM or access control related parameters needed for operation of the AMF 502) and signal the session parameters to the AMF 502 in an eleventh communication 546. In certain embodiments, the first and/or second SMFs 504 and 506 store CP/NC SM parameters in a remote unit 102 context. In various embodiments, during a UP connection activation procedure, the first and/or second SMFs 504 and 506 may send SMF-assisted RAN information to an AN (e.g. NG-RAN node) within an N2 SM information message. For example, the first and/or second SMFs 504 and 506 may send a communication duration time, periodic time, expected number of uplink/downlink packets, and/or expected UE activity behavior to an NG-RAN node in order to assist the NG-RAN in deciding and/or configuring an RRC inactive state and/or configuring the connected state parameters of a remote unit 102. As may be appreciated, the expected UE activity behavior may mean an expected pattern of a UE changes between CM-connected and CM-idle states. In one example, SMF-assisted RAN information may be used in the NG-RAN node to derive the expected UE activity behavior as described in TS 23.401. In another example, the SMF derives the expected UE activity behavior and signals it to the NG-RAN node within the N2 SM information message during the activation of the UP connection for the PDU session. One reason to derive the expected UE activity behavior information in an SMF and signal it to the NG-RAN node is that the expected UE activity behavior may be applicable only when the associated PDU session (serving the associated application in the UE) is activated; otherwise if another PDU session is activated another expected UE activity behavior may be applicable, if determined in another corresponding SMF. The SMF may determine the expected UE activity behavior information considering the communication duration time and/or the periodic time from the CP/NC SM parameters.

In certain embodiments, the first and/or second SMFs 504 and 506 may use CP/NC SM parameters to configure the UPF. For example, the SMF can use the CP/NC parameter Suggested Number of Downlink Packets to configure a UPF with a number of downlink packets to buffer. In various embodiments, the first and/or second SMFs 504 and 506 may use SM parameters for internal processing. For example, the first and/or second SMFs 504 and 506 may use a communication duration time to determine to deactivate a UP connection after the communication duration time expires and/or the first and/or second SMFs 504 and 506 may perform a procedure CN-initiated selective deactivation of a UP connection of an existing PDU session.

In some embodiments, the first and/or second SMFs 504 and 506 may determine whether to use control plane or UP data delivery during PDU session establishment or to switch from control plane to UP delivery based on a parameter CP/UP delivery preference. This is described in detail in FIG. 6.

In various embodiments, in response to there being multiple SCS/ASs associated with a same DNN/S-NSSAI, a traffic filter (e.g., based on SCS/AS's IP address) may be used to differentiate traffic from/to multiple SCS/ASs within the same DNN/S-NSSAI. For example, the first and/or second SMFs 504 and 506 may configure a UPF to: indicate to the first and/or second SMFs 504 and 506 the source IP address of the SCS/Ass; or differently forward packets depending on the source IP address of received downlink packets (e.g., data from one SCS/AS is forwarded over control plane NAS delivery and s data of another SCS/AS is forwarded over UP delivery). In certain embodiments, processing of CP/NC SM parameters in the first and/or second SMFs 504 and 506 may depend on policy rules received from a PCF, if available.

In some embodiments, the eleventh communication 546 from the first SMF 504 (and/or the second SMF 506) to the AMF 502 may include the first SMF 504 informing the AMF 502 about session parameters (e.g., parameters derived from the CP/NC SM parameters as MM-relevant (or access control relevant) parameters for processing in the AMF 502). As may be appreciated, the eleventh communication 546 may be performed either: during a successful PDU session establishment procedure in which an SMF sends a PDU session establishment accept message to a remote unit 102; or an SMF may initiate a service operation by transmitting a message to the AMF 502 in response to SM parameters being updated from the UDM/UDR 508. In certain embodiments, the eleventh communication may include: an existing service operation (e.g., Nsmf_PDUSession_SMContextStatusNotify (SUPI, PDU session ID, session parameters, etc.)) to notify the AMF 502 about new MM parameters; Nsmf_EventExposure_Notify (SUPI, PDU Session ID, Session parameters, etc.) transmitted to the AMF 502 (in response to the AMF 502 being previously subscribed); or a new service operations being specified.

In various embodiments, the eleventh communication 546 may include the AMF 502 receiving multiple session parameters sets for different PDU sessions (e.g., from different SMFs or from the same SMF). In some embodiments, the AMF 502 may store session parameters within a PDU session level context. In certain embodiments, based on an operator configuration or preference, the AMF 502 may merge session parameter sets associated with PDU sessions for which a UP Connection is to be activated. In other words, in response to a UP connection for a particular PDU session not being activated, corresponding session parameters may not be considered for RRC inactive assistance information, but may be considered for PSM mode (or MICO mode) or eDRX mode settings, for example.

In some embodiments, CP/NC MM parameters may include: a stationary indication; an expected UE moving trajectory; and/or a scheduled communication time. In various embodiments, CP/NC SM parameters may include: from CP parameters: a periodic time; a communication duration time; a scheduled communication time; and/or a SCS/AS IP address; and from NC parameters: a maximum Latency; a maximum response time and suggested number of downlink packets (buffering); and/or a CP/UP delivery preference.

In certain embodiments, session parameters (from an SMF to the AMF 502) may include: a stationary indication; an expected UE moving trajectory; a periodic time; a scheduled communication time; a maximum latency; a maximum response time; and so forth. In some embodiments, CP/NC MM parameters and CP/NC SM parameters may include a validity time (e.g., if indicated by an SCS/AS) and the validity time may be provided an end consumer NF (e.g., an SMF and/or the AMF 502). In other words, after expiration of a validity time, the UDM/UDR 508, an SMF, and/or the AMF 502 may delete corresponding CP/NC parameters autonomously. As found herein, Table 4 shows an example how a UDM/UDR 508 may update stored UE subscription information in response to the UDM/UDR 508 categorizing 528 CP/NC parameter sets into CP/NC MM parameters and CP/NC SM parameters.

In some embodiments, based on CP/NC SM parameters received from the UDM/UDR 508, an SMF may determine whether to apply UP or control plane delivery (or transmission) of data to a remote unit 102. Such a decision at the SMF may be performed either: during PDU session establishment; or to later switch from control plane to UP delivery.

| Subscription Data Type | Field | Description |
|---|---|---|
| Access and Mobility Subscription Data (Data for UE Registration and Mobility Management) | SUPI | Key |
| | GPSI List | List of the GPSI used both inside and outside of the 3GPP system to address a 3GPP subscription. |
| | Internal Group ID-list | List of the subscribed internal group(s) to which the UE belongs to. |
| | Subscribed-UE-AMBR | The maximum aggregated uplink and downlink MBRs to be shared across all Non-GBR QoS Flows according to the subscription of the user. |
| | Subscribed S-NSSAIs | The Network Slices that the UE subscribes to. |
| | Default S-NSSAIs | The Subscribed S-NSSAIs marked as default S-NSSAI. |
| | UE Usage Type | As defined in TS 23.501, clause 5.15.7.2. |
| | RAT restriction | 3GPP Radio Access Technologies a UE is not allowed to access. |
| | Forbidden area | Defines areas in which the UE is not permitted to initiate any communication with the network. |
| | Service Area Restriction | Indicates allowed areas in which the UE is permitted to initiate communication with the network, and non-allowed areas in which the UE and the network are not allowed to initiate Service Request or SM signalling to obtain user services. |
| | Core Network type restriction | Defines whether UE is allowed to connect to 5GC for this PLMN. |
| | RFSP Index | An index to specific RRM configuration in the NG-RAN. |
| | Subscribed Periodic Registration Timer | Indicates a subscribed Periodic Registration Timer value. |
| | Priority Services | Indicates the user is subscribed to priority service (MPS) as indicated in TS 23.501, clause 5.16.5. |
| | CP/NC MM parameters | Stationary indication, UE moving trajectory, validity time. |
| Slice Selection Subscription data (data needed for Slice Selection as described in clause 4.2.2.2.3) | SUPI | Key |
| | Subscribed S-NSSAIs | The Network Slices that the UE subscribes to. In roaming case, it indicates the subscribed network slices applicable to the serving PLMN. |
| UE context in AMF data | SUPI | Key |
| | AMF | Allocated AMF for the registered UE. Include AMF address and AMF NF Id. |
| | Access Type | 3GPP or non-3GPP access through this AMF |
| SMF Selection Subscription data (data needed for SMF Selection as described in clause 6.3.2 of TS 23.501) | SUPI | Key |
| | Subscribed DNN list | List of the subscribed DNNs for the UE. |
| | Default DNN | The default DNN if the UE does not provide a valid DNN. |
| | LBO Roaming Information | Indicates whether LBO roaming is allowed per DNN, or per (S-NSSAI, subscribed DNN) |
| UE context in SMF data | SUPI | Key |
| | PDU Session Id(s) | List of PDU Session Id(s) for the UE |
| | For each PDU Session Id: | |
| | DNN | DNN for the PDU Session. |
| | SMF | Allocated SMF for the PDU Session. Includes SMF IP Address and SMF NF Id. |
| SMS Management Subscription data (data needed by SMSF for SMSF Registration) | SUPI | Key |
| | SMS parameters | Indicates SMS parameters subscribed for SMS service such as SMS teleservice, SMS barring list |

-continued

| Subscription Data Type | Field | Description |
| --- | --- | --- |
| SMS Subscription data (data needed in AMF) | SUPI | Key |
| | SMS Supported | Indicates whether the UE supports SMS delivery over NAS via 3GPP access, or via non-3GPP access, or via both the 3GPP and non-3GPP access. |
| | SMSF address | Indicates SMSF address subscribed for SMS service. |
| Session Management Subscription data (data needed for PDU Session Establishment) | SUPI | Key |
| | Session Management Subscription data contains one or more S-NSSAI level subscription data: | |
| | S-NSSAI | Indicates the value of the S-NSSAI. |
| | Subscribed DNN list | List of the subscribed DNNs for the S-NSSAI. |
| | For each DNN in S-NSSAI level subscription data: | |
| | UE Address | Indicates the subscribed static IP address(es) for the IPv4 or IPv6 or IPv4v6 type PDU Sessions accessing the DNN, S-NSSAI. |
| | Allowed PDU Session Types | Indicates the allowed PDU Session Types (IPv4, IPv6, IPv4v6, Ethernet, and Unstructured) for the DNN, S-NSSAI. |
| | Default PDU Session Type | Indicates the default PDU Session Type for the DNN, S-NSSAI. |
| | Allowed SSC modes | Indicates the allowed SSC modes for the DNN, S-NSSAI. |
| | Default SSC mode | Indicate the default SSC mode for the DNN, S-NSSAI. |
| | 5GS Subscribed QoS profile | The QoS Flow level QoS parameter values (5QI and ARP) for the DNN, S-NSSAI (see clause 5.7.2.7 of TS 23.501). |
| | Charging Characteristics | This information is defined in TS 32.240; it may e.g. contain information on how to contact the Charging Function. This information, when provided shall override any corresponding predefined information at the SMF |
| | Subscribed-Session-AMBR | The maximum aggregated uplink and downlink MBRs to be shared across all Non-GBR QoS Flows in each PDU Session, which are established for the DNN, S-NSSAI. |
| | Static IP address/prefix | Indicate the static IP address/prefix for the DNN, S-NSSAI. |
| | CP/NC SM parameters: | Communication duration time, periodic time, scheduled communication time, suggested number of downlink packets (buffering), expected number of uplink/downlink packets, SCS/AS IP address, CP/UP preference, DNAI, validity time(s). |
| Identifier translation | GPSI | Generic Public Subscription Identifier used inside and outside of the 3GPP system to address a 3GPP subscription. Used as the Key for translation to the corresponding SUPI (and optionally corresponding MSISDN). |
| SUPI | Corresponding (Optional) MSISDN | SUPI for input GPSI Corresponding GPSI (MSISDN) for input GPSI (External Identifier). This is optionally provided for legacy SMS infrastructure not supporting MSISDN-less SMS. The presence of an MSISDN should be interpreted as an indication to the NEF that MSISDN shall be used to identify the UE when sending the SMS to the SMS-SC via T4. |
| | User Plane Security Policy | Indicates the security policy for integrity protection and encryption for the user plane. |

Figure 6:
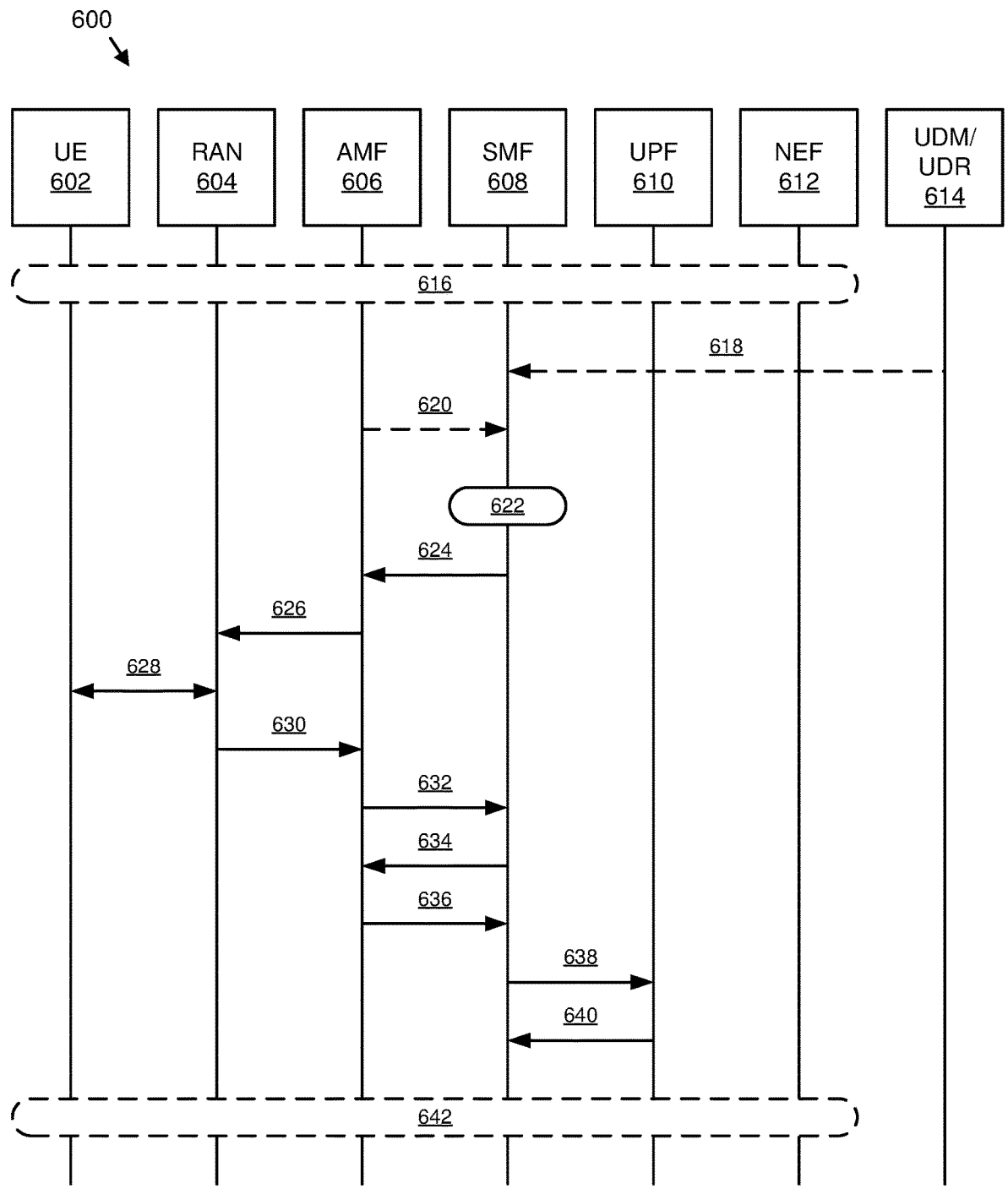
FIG. 6 illustrates a further embodiment of communications of remote unit behavior parameters.

FIG. 6 illustrates a further embodiment of communications 600 of remote unit 102 behavior parameters. Specifically, communications 600 between a UE 602, a RAN 604, an AMF 606, an SMF 608, a UPF 610, an NEF 612 (e.g., NEF/SCEF), and a UDM/UDR 614 are illustrated. As may be appreciated, any of the communications 600 described herein may be considered messages and/or parts of messages.

In some embodiments, an existing PDU session may be configured to transmit 616 uplink and downlink small data ("SD") over a control plane (e.g., over an NAS protocol between the SMF 608 and the UE 602 via the AMF 606. In one embodiment, the SD may be transmitted over an N6 interface to an SCS/AS. In another embodiment, the SD may be transmitted over the NEF 612 and NBI API to an SCS/AS.

In certain embodiments, during PDU session establishment, the SMF 608 may determine to configure control plane delivery of data for a PDU session based on previously received (e.g., subscription or CP/NC SM parameters) information from the UDM/UDR 614. For example, an SCS/AS/AF may have sent a parameter for control plane preference in the UDM/UDR 614 and the SMF 608 may receive this parameter from the UDM/UDR 614 during PDU session establishment. In such embodiments, the SMF 608 may use this parameter to determine to configure control plane delivery of data. In other words, the UE 602 may not need to indicate explicitly a control plane delivery method during PDU session establishment signaling.

In some embodiments, a first communication 618 from the UDM/UDR 614 to the SMF 608 may include the UDM/UDR 614 updating SM parameters in the SMF 608 in response to an SCS/AS having updated CP/NC parameters in the UDR/UDM 614. For example, the SMF 608 may be updated with a new periodicity time, periodicity might be switched-off, and/or the SMF 608 may be updated with a new transmission duration time.

In certain embodiments, an SCS/AS/AF may signal and/or modify a preference for UP or control plane transmission by changing the value of the CP/UP preference parameter. For this purpose, either a CP/UP preference parameter is an SM parameter stored in the UDM/UDR 614, or the CP/UP preference parameter is a parameter stored and/or managed by a PCF. In some embodiments, an SCS/AS may send to the NEF 612 a CP/UP preference indication which may then be forwarded to the UDM/UDR 614. In such embodiments, the UDM/UDR 614 may process this CP/UP preference indication and the UDM/UDR 614 may determine to update a relevant PCF managing the UE's 602 policy rules. In various embodiments, an SCS/AS/AF may determine a CP/UP preference parameter value (e.g., UP preference value or control plane preference value, which may be encoded as e.g., "00", "01", or "10" bit map) based on an amount of data to transmit or based on a traffic pattern (the traffic pattern may be explicitly signaled to the network). Further, the SCS/AS/AF may maintain information from the MNO about the charging conditions or charging rules applied by the MNO when delivering data over control plane or over UP; and the SCS/AS/AF may consider this information together with the amount of data or traffic pattern when determining the value of the CP/UP delivery preference. In certain embodiments, in response to the SCS/AS/AF determining that a software and/or firmware update is needed, a same PDU session may be used to deliver both SD over control plane and software updates over a user plane in non-overlapping time spans. The CP/UP preference parameter may be sent from the SCS/AS/AF to the NEF 612 (i.e. over a T8 interface) either as part of the control plane parameter set, as part of the NC parameters, or as independent parameter.

In various embodiments, a second communication 620 from the AMF 606 to the SMF 608 may include the AMF 606 configuring a threshold value for a maximum amount of data (e.g., number of packets, number of bytes, etc.) to be transmitted over a control plane. The second communication 620 may occur either during PDU session establishment for control plane transmission or at a later time.

In certain embodiments, either based on triggers from the first communication 618 or the second communication 620, or based on an internal configuration in the SMF 608, the SMF 608 may determine 622 to switch a data transmission mechanism from control plane transmission to UP transmission. In some embodiments, a switch from control plane to UP transmission may be done to avoid an overload of the control plane (including the AMF 606 and SRBs) which may be meant for transmission of control plane messages.

In some embodiments, a third communication 624 from the SMF 608 to the AMF 606 may include the SMF 608 invoking a service operation. In such embodiments, the third communication 624 may include a Namf_Communication_N1N2MessageTransfer (e.g., SM context ID, N2 SM information (PDU session ID, N3 tunnel information, QFIs, QoS profiles, session-AMBR), N1 SM container (PDU session modification command (PDU session ID, UP indication, QoS rules, QoS rule operation, session-AMBR)), and so forth). In certain embodiments, N2 SM information may be similar to N2 SM information used during UP connection activation (e.g., it contains N3 tunnel info, PDU session ID, and QoS-related information). In various embodiments, in response to the data (e.g. SD) being received/sent via the NEF 612, the SMF 608 may select and/or configure the UPF 610.

In some embodiments, in response to the UE 602 being in an idle state (e.g., CM-IDLE state), the AMF 606 may decide whether to page the UE 602 based on an ATC status. In various embodiments, the AMF 606 may update and/or store the UE 602 context based on a Namf_Communication_N1N2MessageTransfer, in response to the UE 602 not being reachable.

In certain embodiments, a fourth communication 626 from the AMF 606 to the RAN 604 may include the AMF 606 sending an N2 PDU session request (e.g., N2 SM information received from the SMF 608, NAS message (e.g., PDU session ID, N1 SM container (PDU session modification command))) message to the RAN 604.

In various embodiments, a fifth communication 628 between the RAN 604 and the UE 602 may include the RAN 604 issuing AN specific signaling exchange with the UE 602 that is related to information received from the SMF 608. For example, in embodiments with a 3GPP RAN, an RRC connection reconfiguration may take place with the UE 602 establishing RAN 604 resources related to QoS Rules for a PDU session request received in the fourth communication 626.

In some embodiments, a sixth communication 630 from the RAN 604 to the AMF 606 may include the RAN 604 transmitting an N2 session response to the AMF 606. In certain embodiments, a seventh communication 632 from the AMF 606 to the SMF 608 may include the AMF 606 forwarding N2 SM information and/or an N1 container to the SMF 608. In various embodiments, an eighth communication 634 from the SMF 608 to the AMF 606 and a ninth communication 636 from the AMF 606 to the SMF 608 may include communications for updating the UE 602 context to reconfigure from control plane delivery to UP delivery.

In some embodiments, a tenth communication 638 from the SMF 608 to the UPF 610 and an eleventh communication 640 from the UPF 610 to the SMF 608 may include communications for N4 modification and/or creation. In certain embodiments, communications 642 may be used for SD transmission over UP.

In various embodiments, the AMF 606 may send "RRC inactive assistance information" to be used in the RAN 604 to determine whether the UE 602 may be transitioned to an RRC inactive state. However, the RAN 604 behavior may not depend on a used and/or activated UP connection.

In certain embodiments, the SMF 608 influences NG-RAN behavior based on an activated UP connection. There are several options to perform this. In one embodiment, as described in FIG. 5, the SMF 608 may update the UE's 602 PDU session context in the AMF 606 with session parameters which may be used in the AMF 606 to determine "RRC inactive assistance information" which is extended with periodic time and/or communication duration time. In another embodiment, the SMF 608 includes SMF assisted RAN information in N2 SM information sent to an NG-RAN node as described in FIG. 7.

Figure 7:
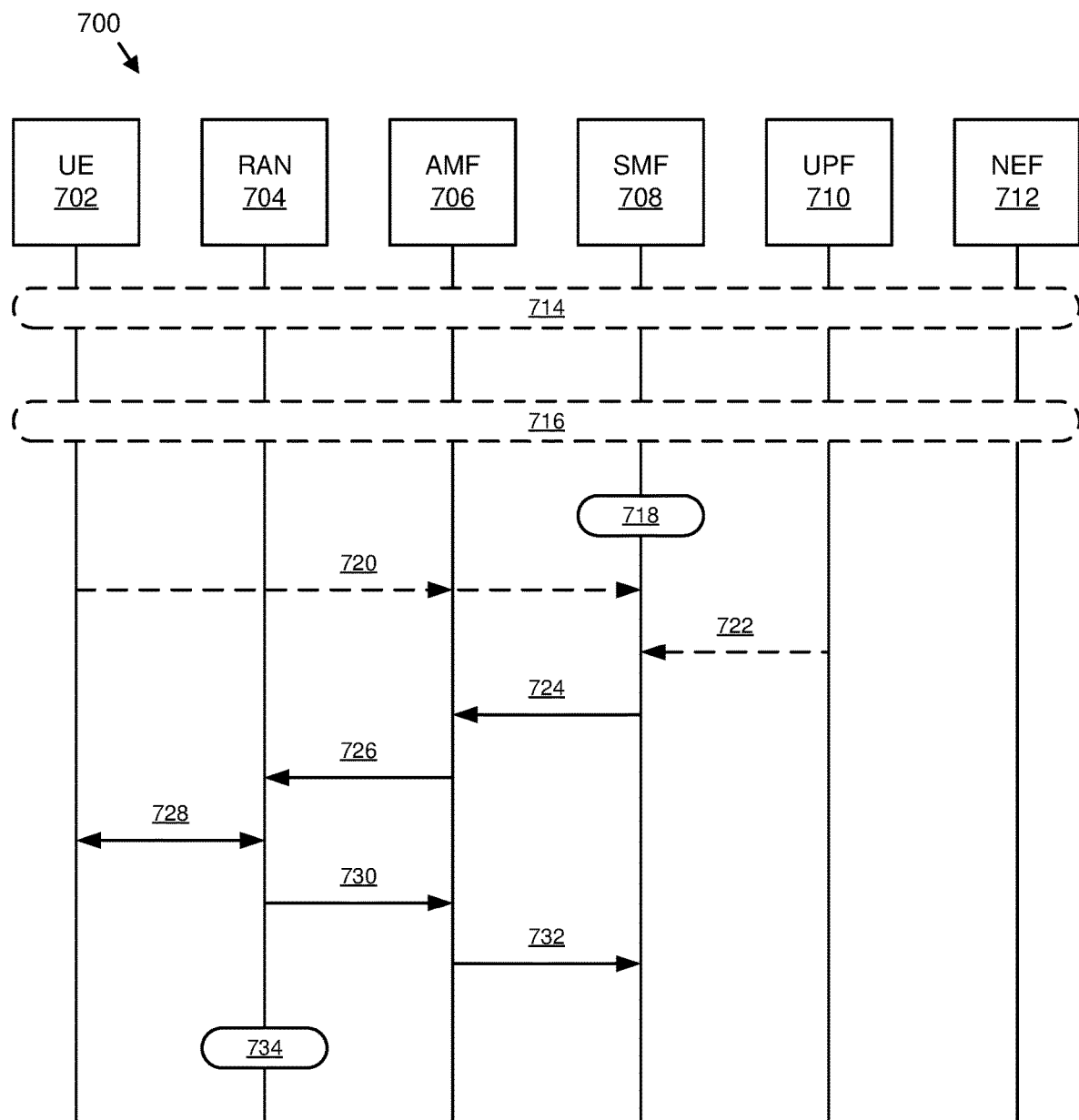
FIG. 7 illustrates an additional embodiment of communications of remote unit behavior parameters.

FIG. 7 illustrates an additional embodiment of communications 700 of remote unit 102 behavior parameters. Specifically, communications 700 between a UE 702, a RAN 704, an AMF 706, an SMF 708, a UPF 710, and an NEF 712 are illustrated. As may be appreciated, any of the communications 700 described herein may be considered messages and/or parts of messages.

In some embodiments, SD of a PDU session may be configured to be transmitted 714 over a control plane. In such embodiments, in response to CP transmission being configured, data may be delivered over an NAS protocol between the SMF 708 and the UE 702. The data may be received by the SMF 708 either over an N6 interface from the UPF 710 or from the NEF 712.

In certain embodiments, SD of the PDU session may be configured to be transmitted 716 over a user plane. In such embodiments, the data may be received by the UPF 710 either over an N6 interface or from the SMF 708 via the NEF 712. In various embodiments, the UE 702 may be in an idle state (e.g., CM-IDLE state) at some point.

In some embodiments, the SMF 708 stores 718 CP/NC SM parameters (e.g., received from a UDM/UDR as described in relation to FIG. 5 or received from the AMF 706). Based on CP/NC SM parameters the SMF 708 may determine 718 SMF assisted RAN information to be sent to the RAN 704. In certain embodiments, a first communication 720 from the UE 702 to the SMF 708 may include the UE 702 transmitting a service request to the SMF 708 via the AMF 706. In various embodiments, a second communication 722 from the UPF 710 to the SMF 708 may include the UPF 710 transmitting DL data to the SMF 708. In some embodiments, due to mobile originated communication (e.g., the first communication 720) or due to mobile terminated communication (e.g., the second communication 722), a user plane connection for a PDU session may be activated.

In certain embodiments, a third communication 724 from the SMF 708 to the AMF 706 may include the SMF 708 initiating signaling or service operation. In such embodiments, the service operation may be initiated using Namf_Communication_N1N2MessageTransfer (e.g., N2 SM information (SMF assisted RAN information (expected UE activity behavior, communication duration, periodic time, and/or expected number of uplink/downlink packets, etc.), N1 SM container, etc.)). In various embodiments, the SMF 708 may include new parameters within an S2 SM information container (e.g., expected UE activity behavior, a communication duration, expected number of uplink/ downlink packets, and/or a periodic time, etc.). In such embodiments, the new parameters included in the N2 SM information container from the SMF 708 may be in general referred as SMF assisted RAN information including further parameters. The SMF 708 may determine the expected UE activity behavior information considering a communication duration time and/or a periodic time from the CP/NC SM parameters, but also other parameters gained from statistics gathered internally in the network. The SMF 708 may determine an expected number of uplink/downlink packets parameter based on the CP/NC SM parameters, for example. As may be appreciated, the parameter expected number of uplink/downlink packets may include separate parameters (e.g., expected number of uplink packets parameter and/or expected number of downlink packets parameter), or may be coded as a parameter with multiple values (e.g., [2, 3] meaning 2 uplink packets and 3 downlink packets, or [2, 0] meaning 2 uplink packets and 0 downlink packets).

In some embodiments, a fourth communication 726, a fifth communication 728, a sixth communication 730, and a seventh communication 732 may be substantially similar to communication as described in TS 23.502 clause 4.2.3.2 steps 12-14.

In various embodiments, the RAN 704, after receiving SMF assisted RAN information from the SMF 708 (including e.g., parameters such as communication duration, expected UE activity behavior, or periodic time), may use these parameters to configure or reconfigure 734 a radio connection with the UE. For example, based on a periodic time, the RAN 704 may determine whether to keep the UE 702 in a connected state (e.g., RRC connected state), to configure an inactive state (e.g., RRC inactive state), or to trigger an idle state (e.g., trigger an RRC idle state via releasing an RRC connection or triggering release of AN resources procedure). In another example, in response to the RAN 704 determining to configure an inactive state, the RAN 704 may determine based on communication duration parameters whether to deactivate the inactive state or to trigger release of AN resources procedure after the communication duration time expires. In another example, the RAN 704 may receive an expected UE activity behavior from the SMF 708 and use this information to determine a transition pattern between RRC connected, RRC idle, and/or RRC inactive states.

In various embodiments, the AMF 706 may provide the following RRC inactive assistance information to the RAN 704: UE specific DRX values; a registration area provided to the UE; a periodic registration update timer; in response to the AMF 706 enabling a MICO mode for the UE 702, an indication that the UE 702 is in MICO mode; and/or information from the UE 702 permanent identifier, as defined in TS 38.304, that allows the RAN 704 to calculate the UE's RAN paging occasions.

In some embodiments, the SMF 708 during an UP connection activation procedure may also provide SMF assisted RAN information from the SMF 708 which is specific to an activated PDU session. In certain embodiments, in response to the RAN 704 having multiple activated PDU sessions simultaneously and the RAN 704 receives SMF assisted RAN information from the SMF 708 for multiple PDU sessions, the RAN 704 may merge the multiple SMF assisted RAN information from the SMF 708 and determine to configure the radio Uu interface correspondingly. The RAN 704 may also receive RAN information from the AMF 706 (e.g., RRC inactive assistance information) and SMF assisted RAN information from one or more SMFs 708. In such cases the RAN 704 may merge the RAN information of the same type (e.g., if there are multiple communication duration parameters, the RAN 704 may take the larger value to configure a UE inactivity time, for example) or the RAN 704 may use different information types for different purposes. For example, the RAN 704 may use RRC inactive assistance information from the AMF 706 to determine an RRC inactive state configuration, but the RAN 704 may use SMF assisted RAN information from the SMF 708 (e.g., expected UE activity behavior, expected number of uplink/downlink packets, and/or communication duration) to determine a time to initiate transition from RRC connected to RRC inactive state, and/or to initiate transition from RRC connected to RRC idle state. In various embodiments, an RRC inactive state may be configured by the RAN 704 in response to there being a PDU session using control plane transmission of data (e.g., without having user plane resources activated). In some embodiments, an RRC inactive state may be configured during a time in which there is a mixture of a PDU session using a control plane transmission and a PDU session using the UP transmission. In certain embodiment, if the UE state is CM-connected and RRC inactive, and due to the activation of a UP connection of a PDU session, the RAN 704, based on received SMF assisted RAN information, may decide to change from RRC inactive state to RRC connected state. In yet another embodiment, based on the received expected number of uplink/downlink packets (e.g., as part of SMF assisted RAN information) the RAN 704 may determine whether the data to be transmitted is small data (e.g., just a single packet) or bigger size data; or the RAN 704 may determine whether uplink and/or downlink communication has been completed based on a number of packets transmitted in an uplink and/or a downlink direction. If the RAN 704 determines that uplink and/or downlink communication has been completed, the RAN 704 may decide to initiate release of AN resources by sending an RRC connection release message with or without an indication for resume identity, and, respectively, whether to initiate N2 signaling transmission to the AMF 706 to request release of the AN resources. The presence of a resume identity indication may mean transition from an RRC connected state to an RRC inactive state. The non-presence of a resume identity indication may mean transition from an RRC connected state to an RRC idle state. In certain embodiments, the parameter periodic time (e.g., as part of the SMF assisted RAN information) may be used in the RAN 704 to determine whether the transmission of data is frequent or infrequent; and, consequently, to determine which RRC state for the UE would be the most appropriate in order to save UE power consumption and/or signaling transmitted to the CN due to RRC state transitions.

In certain embodiments, CP/NC parameter sets may not be processed and classified by a UDM/UDR into CP/NC MM parameters and CP/NC SM parameters, but the CP/NC parameter sets may be stored as CP/NC MM parameters. In one embodiment, the UMD/UDR may determine and store, if available, a DNN and/or S-NSSAI corresponding to each CP/NC MM parameter set. In such an embodiment, CP/NC MM parameter sets may be sent to the AMF 706 together with associated DNN and/or S-NSSAI. In some embodiments, the AMF 706 stores CP/NC MM parameter sets and associated DNN and/or S-NSSAI. In various embodiments, in response to the UE 702 initiating a PDU session establishment procedure, if the AMF 706 determines that a DNN and/or S-NSSAI included in the N1 interface signaling from the UE 702 for PDU session establishment is related to a stored CP/NC MM parameter set, the AMF 706 may send the associated CP/NC MM parameter sets or a portion thereof related to session management to the SMF 708 in an N11 message from the AMF 706 to the SMF 708. In other words, processing and classifying CP/NC MM parameter sets as SM parameters may be done in the AMF 706 and the SM parameters may be sent to the SMF 708. For example, a modified service operation from the AMF 706 to the SMF 708 may be as follows: Nsmf_PDUSession_CreateSMContext Request (SUPI, DNN, S-NSSAIs, PDU session ID, AMF ID, request type, PCF ID, N1 SM container (PDU session establishment request), CP/NC SM parameters). In some embodiments, CP/NC SM parameters are SM parameters determined by the AMF 706 as session-relevant parameters.

In various embodiments, in response to a PDU session already being established to a particular DNN and/or S-NSSAI and the AMF 706 receives a new and/or updated CP/NC MM parameter set, the AMF 706 may initiate, via communication to the SMF 708, a service operation (e.g., Nsmf_PDUSession_UpdateSMContext Request (SUPI, PDU session ID, CP/NC SM parameters, request type, cause, etc.)). In such embodiments, the service operation message may be insert as new or updated SM parameters in the SMF 708.

In some embodiments, CP/NC SM parameters sent from the AMF 706 to the SMF 708 may be: a periodic time; a communication duration time; an SCS/AS IP address; a suggested number of downlink packets (buffering); maximum latency; a CP/UP delivery preference; DNAI; and/or SSC mode preference, etc. In certain embodiments, the SMF 708 may use CP/NC SM parameters as described herein in relation to FIG. 5, FIG. 6, and/or FIG. 7. In various embodiments, the SMF 708 may not need to determine and signal session parameters to the AMF 706.

Figure 8:
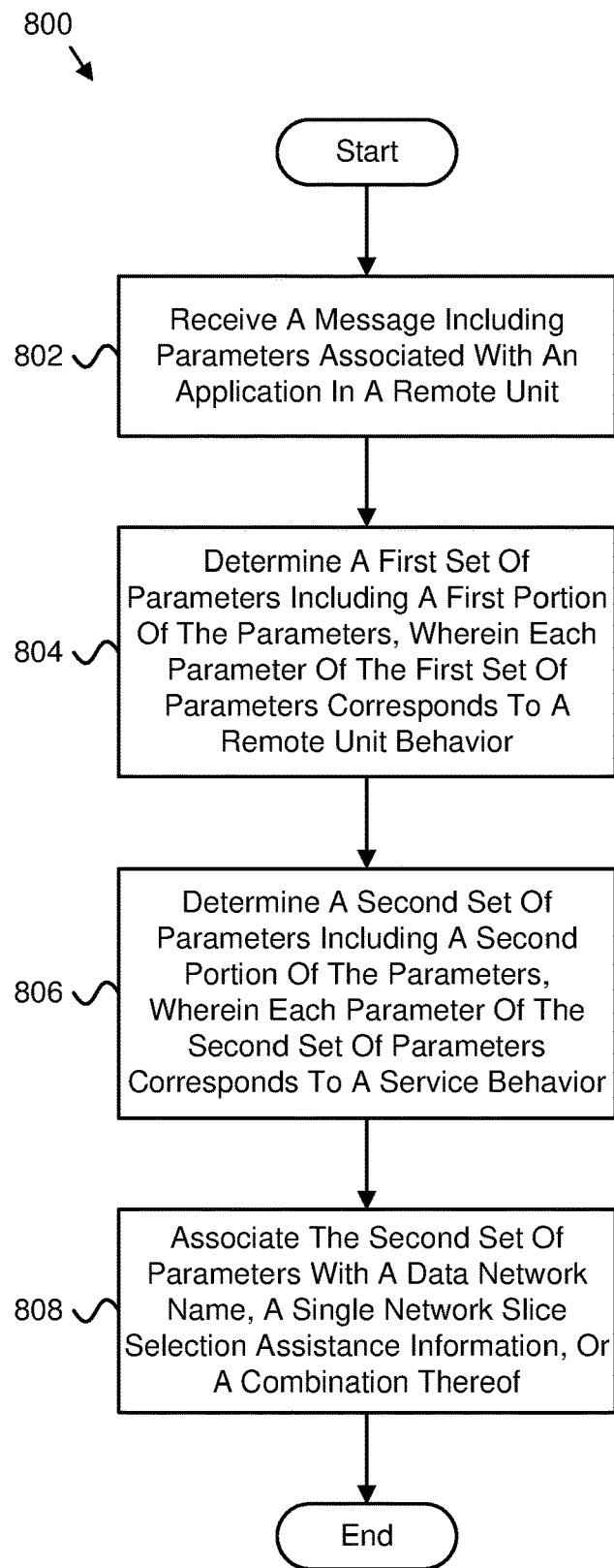
FIG. 8 is a schematic flow chart diagram illustrating one embodiment of a method for determining remote unit behavior parameters.

FIG. 8 is a schematic flow chart diagram illustrating one embodiment of a method 800 for determining remote unit 102 behavior parameters. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

The method 800 may include receiving 802 a message including parameters associated with an application in a remote unit. In various embodiments, the method 800 includes determining 804 a first set of parameters including a first portion of the parameters, wherein each parameter of the first set of parameters corresponds to a remote unit behavior. In certain embodiments, the method 800 includes determining 806 a second set of parameters including a second portion of the parameters, wherein each parameter of the second set of parameters corresponds to a service behavior. In some embodiments, the method 800 includes associating 808 the second set of parameters with a data network name, a single network slice selection assistance information, or a combination thereof.

In one embodiment, receiving the message includes receiving one or more messages, and each of the one or more messages contains a validity time for parameters included therein. In a further embodiment, receiving the message includes receive the message from a network exposure function. In certain embodiments, the method 800 includes transmitting the first set of parameters to an access and mobility management function. In various embodiments, the access and mobility management function determines how to configure the remote unit, a base station, or a combination thereof, based on the first set of parameters.

In some embodiments, the method 800 includes transmitting the second set of parameters to a session management function. In various embodiments, the session management function configures one or more network functions or radio entities using the second set of parameters, and the one or more network functions are configured with information specific to a protocol data unit session, a traffic flow, or a combination thereof. In one embodiment, the parameters include information indicating a preference for either a control plane transmission or a user plane transmission. In various embodiments, the parameters include information indicating an internet protocol address, a port number, or a combination thereof corresponding to a service server, an application server, or a combination thereof. In certain embodiments, the parameters include information indicating an identifier corresponding to a service server, an application server, an application, or some combination thereof.

Figure 9:
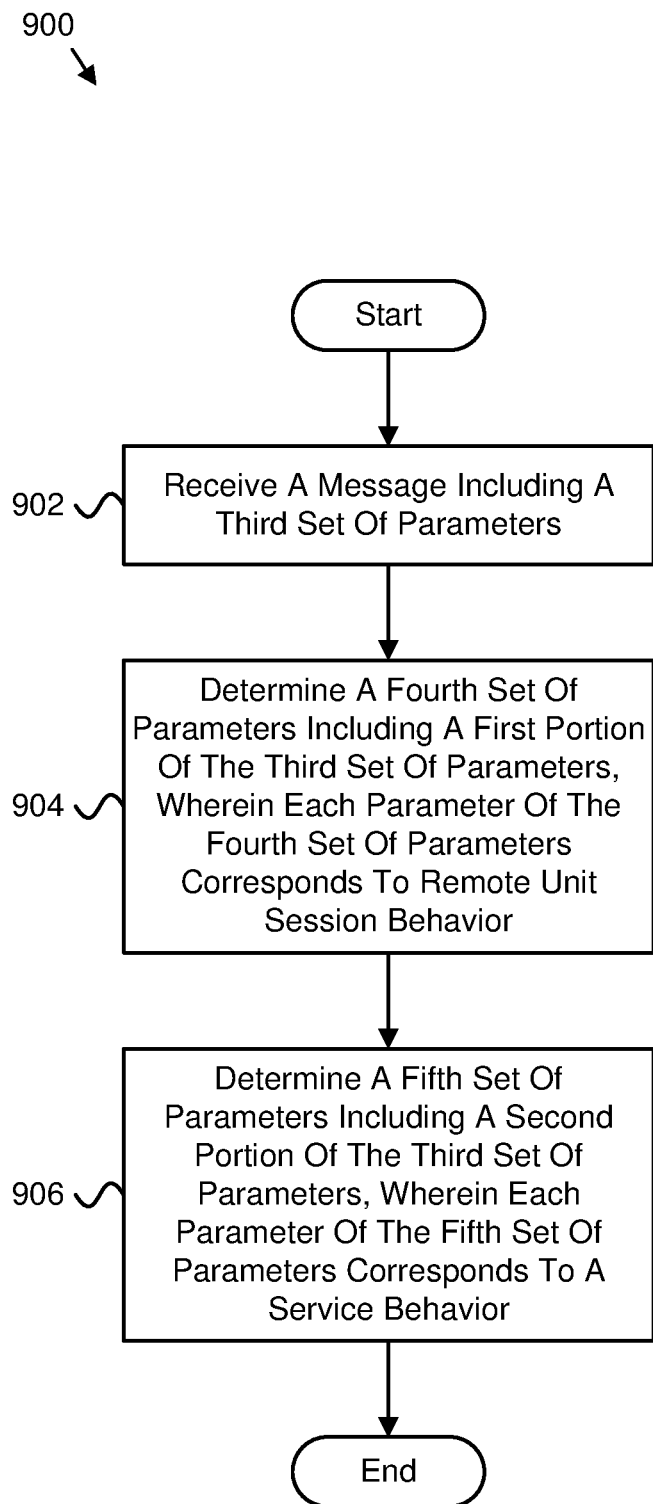
FIG. 9 is a schematic flow chart diagram illustrating another embodiment of a method for determining remote unit behavior parameters.

FIG. 9 is a schematic flow chart diagram illustrating one embodiment of a method 900 for determining remote unit 102 behavior parameters. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

The method 900 may include receiving 902 a message including a third set of parameters. In various embodiments, the method 900 includes determining 904 a fourth set of parameters including a first portion of the third set of parameters, wherein each parameter of the fourth set of parameters corresponds to remote unit session behavior. In certain embodiments, the method 900 includes determining 906 a fifth set of parameters including a second portion of the third set of parameters, wherein each parameter of the fifth set of parameters corresponds to a service behavior.

In one embodiment, the method 900 includes transmitting the fourth set of parameters to an access and mobility management function. In a further embodiment, the method 900 includes determining configuration information for a user plane function based on the fifth set of parameters, and transmitting the configuration information to the user plane function. In certain embodiments, the method 900 includes determining configuration information for a base station based on the fifth set of parameters. In some embodiments, the method 900 includes transmitting the configuration information to the base station. In certain embodiments, the third set of parameters includes a first set of parameters corresponding to a remote unit behavior. In various embodiments, the third set of parameters includes a second set of parameters corresponding to a service behavior. In some embodiments, the third set of parameters includes a first set of parameters corresponding to a remote unit behavior and a second set of parameters corresponding to a service behavior.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a processor; and
a memory coupled to the processor, the memory comprising instructions executable by the processor to cause the apparatus to:
receive, from a unified data management (UDM), a message indicating one or more session management function (SMF) associated parameters and a data network name (DNN) or a single slice selection assistance information (S-NSSAI), wherein the one or more SMF associated parameters comprises one or both of an expected remote unit behavior parameter or a network configuration parameter;
determine first configuration information for a packet data unit (PDU) session; and
configure a user plane function (UPF) with a number of downlink packets for the UPF to buffer based on the network configuration parameter.

2. The apparatus of claim 1, wherein the instructions are further executable by the processor to cause the apparatus to transmit, to the UPF, second configuration information indicating the number of downlink packets for the UPF to buffer.

3. The apparatus of claim 1, wherein the instructions are further executable by the processor to cause the apparatus to transmit the first configuration information to an access and mobility management function (AMF).

4. The apparatus of claim 3, wherein the first configuration information is transmitted during a PDU session establishment procedure or a PDU session modification procedure.

5. The apparatus of claim 1, wherein the expected remote unit behavior parameter indicates a maximum response time for configuring an enhanced discontinuous reception (eDRX).

6. The apparatus of claim 1, wherein the expected remote unit behavior parameter indicates a periodic time for use in a mobile initiated connection only (MICO) mode.

7. The apparatus of claim 1, wherein the instructions are further executable by the processor to cause the apparatus to determine to deactivate a user plane (UP) connection.

8. The apparatus of claim 1, wherein the instructions are further executable by the processor to cause the apparatus to transmit information triggering a PDU session release.

9. The apparatus of claim 1, wherein the network configuration parameter indicates a suggested number of downlink packets.

10. The apparatus of claim 1, wherein the number of downlink packets for the UPF to buffer is further based on a communication duration time.

11. A method of wireless communication at a session management function (SMF), the method comprising:
receiving, from a unified data management (UDM), a message indicating one or more SMF associated parameters and a data network name (DNN) or a single slice selection assistance information (S-NSSAI), wherein the one or more SMF associated parameters comprises one or both of an expected remote unit behavior parameter or a network configuration parameter;
determining first configuration information for a packet data unit (PDU) session; and
configuring a user plane function (UPF) with a number of downlink packets for the UPF to buffer based on the network configuration parameter.

12. The method of claim 11, further comprising transmitting, to the UPF, second configuration information indicating the number of downlink packets for the UPF to buffer.

13. The method of claim 11, further comprising transmitting the first configuration information to an access and mobility management function (AMF).

14. The method of claim 13, wherein the first configuration information is transmitted during a PDU session establishment procedure or a PDU session modification procedure.

15. The method of claim 11, wherein the expected remote unit behavior parameter indicates a maximum response time for configuring an enhanced discontinuous reception (eDRX).

16. The method of claim 11, wherein the expected remote unit behavior parameter indicates a periodic time for use in a mobile initiated connection only (MICO) mode.

17. The method of claim 11, further comprising determining to deactivate a user plane (UP) connection.

18. The method of claim 11, further comprising transmitting information triggering a PDU session release.

19. The method of claim 11, wherein the network configuration parameter indicates a suggested number of downlink packets.

20. The method of claim 11, wherein the number of downlink packets for the UPF to buffer is further based on a communication duration time.

* * * * *